United States Patent [19]
Saxon

[11] Patent Number: 5,261,097
[45] Date of Patent: Nov. 9, 1993

[54] COMPUTER SYSTEM AND METHOD FOR EXECUTING COMMAND SCRIPTS USING MULTIPLE SYNCHRONIZED THREADS

[75] Inventor: Paul D. Saxon, Bellevue, Wash.

[73] Assignee: Digital Equipment Corporation, Maynard, Mass.

[21] Appl. No.: 666,996

[22] Filed: Mar. 11, 1991

[51] Int. Cl.$^5$ ............................................. G06F 15/00
[52] U.S. Cl. ............................... 395/650; 364/221.9; 364/281.3; 364/218.7
[58] Field of Search ................... 395/21, 23, 600, 700, 395/147, 400, 275, 500, 725, 650; 380/4

[56] References Cited
U.S. PATENT DOCUMENTS

| | | |
|---|---|---|
| 4,800,521 | 1/1989 | Carter et al. . |
| 4,901,230 | 2/1990 | Chen et al. . |
| 4,901,231 | 2/1990 | Bishop et al. . |
| 4,953,078 | 8/1990 | Petit . |
| 5,050,071 | 9/1991 | Harris et al. ...................... 364/20 V |

Primary Examiner—Kevin A. Kriess
Assistant Examiner—Kevin Spivak
Attorney, Agent, or Firm—Flehr, Hohbach, Test, Albritton & Herbert

[57] ABSTRACT

A shell program is used in conjunction with a computer that has a multitasking operating system. The shell program interprets sequences of commands, submitted as scripts, and passes the interpreted commands on to the operating system for execution. The shell program accepts scripts which define distinct sets of commands that are to be executed in parallel, and also accepts conditional commands that synchronize the execution of specified sets of commands with other specified sets of commands. Scripts are executed by the shell by creating a thread of execution for each set of commands that is to be executed in parallel with other sets of commands. All the threads created by the shell program share a common address space so that status information from the various threads, as well as computational results generated by these threads, can be used by other ones of the threads to synchronize the execution of such threads.

10 Claims, 2 Drawing Sheets

COMPUTER SYSTEM AND METHOD FOR EXECUTING COMMAND SCRIPTS USING MULTIPLE SYNCHRONIZED THREADS

The present invention relates to shell programs, also known as command language processor programs, used in computers that are capable of executing multiple threads in parallel.

BACKGROUND OF THE INVENTION

Shell programs, also known as command language processor programs, are a layer of software programs above a computer's operation system that allow users to submit commonly used commands to the computer without having to write a complicated program. Examples of such commands include those for copying files stored on disk, printing specified files, running specified programs, directing the output of programs, checking on various aspects of the computer's status, and so on.

Frequently used sequences of commands are often stored in a text file, herein called a script, and then the script is submitted to the computer's shell program. This avoids having an operator or user re-enter these sequences of commands over and over. Some examples of scripts are bootstrap start procedures, backup procedures, system shutdown procedures, log-in procedures, and even program execution procedures for commonly used programs. The shell program serially presents the commands obtained from the script to the computer's operating system for execution.

Each computer's shell program typically has a language and syntax of its own, allowing the shell program to make decisions (such as to skip over a section of commands to a specified point in the script if a certain condition exists), interrogate the operating system (e.g., to determine whether a particular file exists), display messages on a computer terminal, etc.

Some prior art shells allow concurrent, asynchronous execution of commands, by spawning child processes, each of which acts as a totally separate and detached process. This allows parallel execution of multiple scripts, but does not allow the shell to directly synchronize or otherwise communicate with its child processes, because each child process operates in a distinct address space. While it is possible to synchronize separate processes, such synchronization is not inherent in prior art shell programs, and it falls upon the script writer to invent indirect methods of synchronization—which methods are often obscure to future maintainers of the software and costly in terms of resources and execution time.

The present invention allows script writers to explicitly define two or more parallel sequences of commands and to synchronize the execution of those command sequences. The execution of parallel sequences of commands within the shell is split into cooperating threads of execution all of which share a common address space, as opposed to separate processes with distinct address spaces. Since all the threads share a common address space, the shell program of the present invention has the inherent ability to synchronize on specified steps of execution and their individual statuses. For instance, the execution of a particular command or sequence of commands can be made dependent on the successful completion of several other sequences of commands that were executed in parallel.

SUMMARY OF THE INVENTION

In summary, the present invention is a shell program for use in conjunction with a computer that has a multitasking operating system. The shell program interprets sequences of commands, submitted as scripts, and passes the interpreted commands on the operating system for execution. The shell program accepts scripts which define distinct sets of commands that are to be executed in parallel, and also accepts conditional commands that synchronize the execution of specified sets of commands with other specified sets of commands. Scripts are executed by the shell by creating a thread of execution for each set of commands that is to be executed in parallel with other sets of commands. All the threads created by the shell program share a common address space so that status information from the various threads, as well as computational results generated by these threads, can be used by other ones of the threads to synchronize the execution of such threads.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
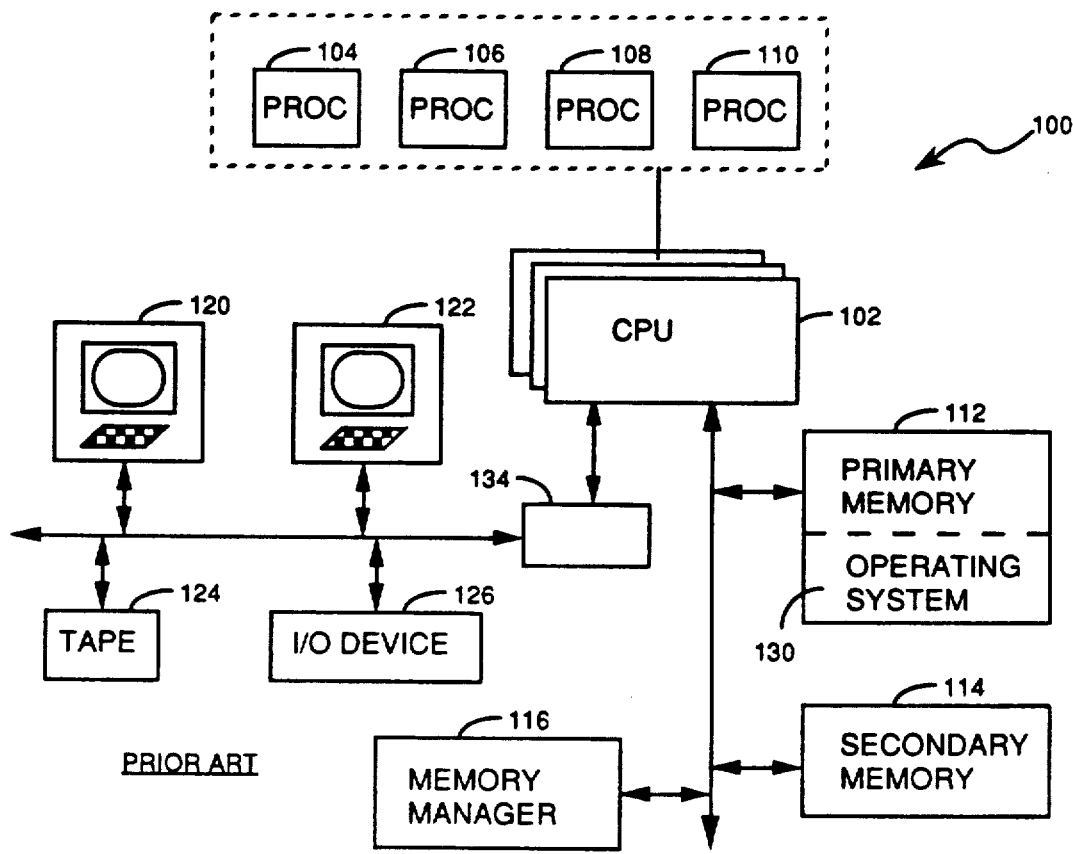
FIG. 1 is a block diagram of a multitasking computer system.

Referring to FIG. 1, a computer system 100 in accordance with the present invention includes a high speed central processing unit (CPU) 102 which concurrently runs several processes 104–110. The CPU 102 may be either a single powerful processor or may contain multiple processors. As is standard in multitasking computer systems, each process has its own address (virtual memory) space which is mapped partially into high speed primary memory 112 and partially into lower speed secondary memory 114 by a virtual memory manager 116. More generally, each process 104–110 is allocated a certain portion of computer's resources, including selected peripheral devices such as terminals 120–122 and other input/output devices 124 and 126 coupled to the CPU 102 by a bus interface 134. Other types of resources which are allocated to selected ones of the processes include specified sets of data and data structures in the system's memory 112–114.

The set of software which controls the computer's operation and the allocation of resources to the processes 104–110 running the computer is called the operating system 130.

Figure 2:
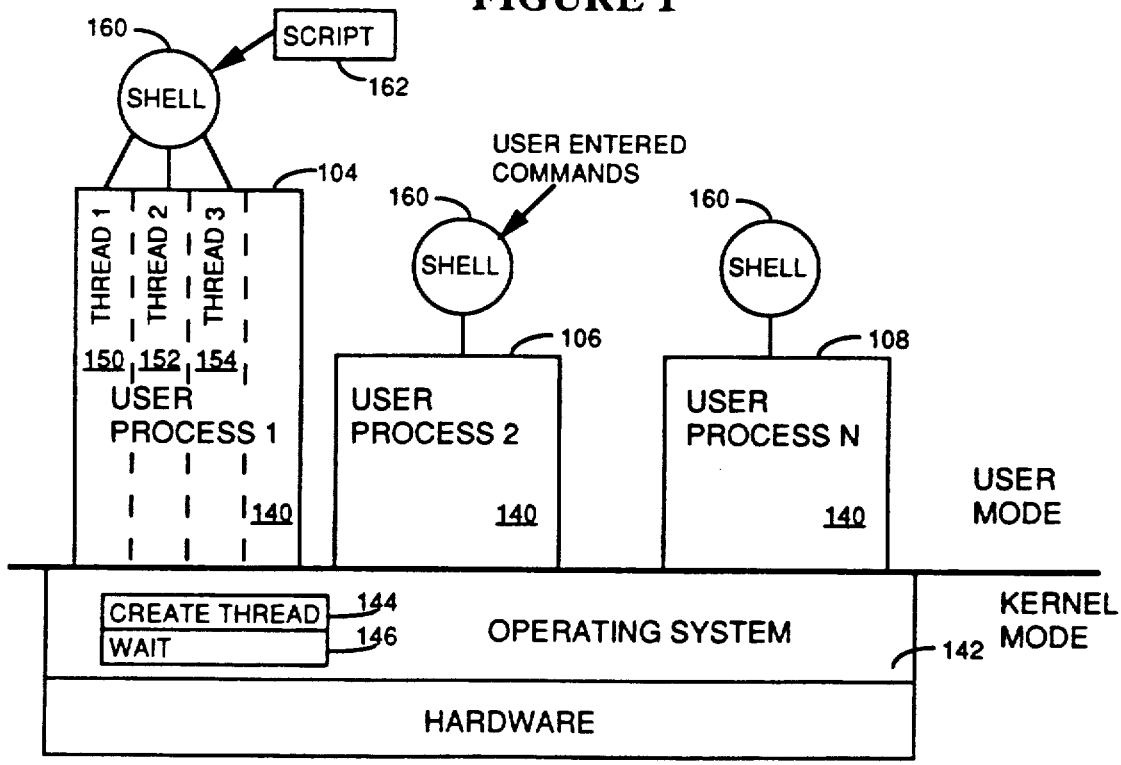
FIG. 2 is a conceptual block diagram of the virtual address spaces of user processes in a computer system incorporating the shell program of the present invention.

As shown in FIG. 2, a predefined portion 142 of the address space of every user process is occupied by the operating system 130 and its data structures. The user mode portion of each user process 140 occupies a distinct virtual memory space. "Kernel mode" is a mode of operation used only be kernel and executive software routines in the operating system. The operating system includes routines that can be used by application or user mode programs to access the system's resources. In the context of the present invention, important operating system programs include a program 144 for creating threads of execution and a program 146 for executing "wait" instructions, such as an instruction to wait for the completion of a program or thread of execution.

When a user process creates a number of separate threads of execution 150, 152, 154, herein called threads, all the threads share the address space of the user process, and therefore the programs running in these threads can communicate with one another, for example computation results, as well as status information as to whether the program running in each thread completed successfully.

Typically, each user process 140 upon creation runs a shell program 160 which interprets sequences of commands, sometimes submitted as a text file called a script 162, and passes the interpreted commands on to the operating system for execution. Such scripts will be stored in and retrieved from secondary storage 114 by the computer system in the same way as other files. Commands may also be submitted to the shell program 160 via a keyboard at the user's terminal 120. In the present invention, the shell program 160 accepts scripts which define distinct sets of commands that are to be executed in parallel, and also accepts "wait" instructions and conditional commands that can be used to synchronize the execution of specified sets of commands with other specified sets of commands. Scripts 162 are executed by the shell 160 by creating a thread of execution for each set of commands that is to be executed in parallel with other sets of commands.

Figure 3:
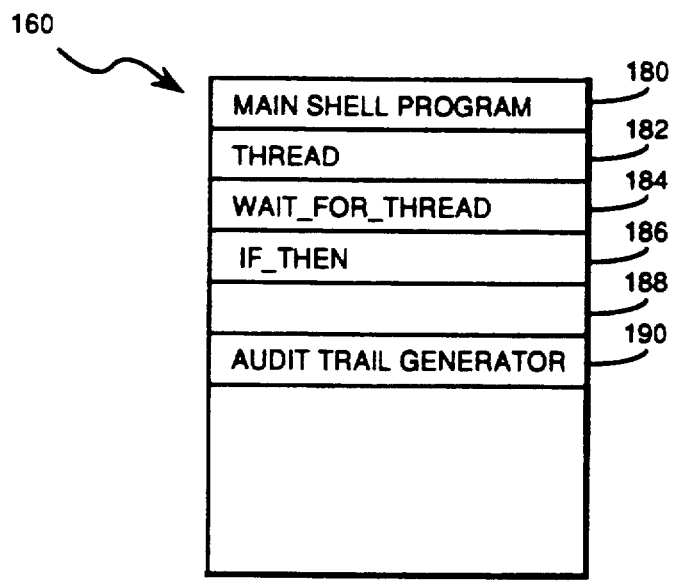
FIG. 3 schematically represents the set of routines that comprise the shell program of the present invention.

As shown in FIG. 3, the shell 160 comprises a main program 180 with a number of subroutines 182, 184, 186, 188, 190, some of which are the routines used to execute particular corresponding commands (such as "thread", "wait_for_thread", and "if" commands) and others of which handle particular types of tasks, such as generating an audit trail. Each "thread" command in a script is processed by the thread subroutine 182 which treats the thread command as a declaration that a new thread of execution is to be generated, and specifies a subset of the commands in the script that are to be separately executed in the new thread.

The following sequence of commands illustrates a possible sequence of commands utilizing the present invention:

```
thread (entry_point, thread_id, p1, . . . , pn)
  command_A
  command_B
  . . .
  wait_for_thread (thread_id, status)
  . . .
entry_point:
  command_X
  command_Y \* end of script
```

In the above script, the command "thread" requests initiation of a parallel thread of execution, which will execute the commands beginning at a point in the text labeled "entry_point". Thus, after the thread command is executed, there are two parallel threads of execution running simultaneously: the invoking thread that was executing the shell program and processing the submitted script beginning at the first line of the script, and a new thread that will process a specified portion of the script while also executing the shell program.

The variable "thread_id" is used to store the identity of the newly initiated thread. The command "wait_for_thread" allows the invoking thread to synchronize its execution with that of the new thread by waiting upon completion of the thread represented by "thread_id", with its status returned in "status". This ability to wait on the completion of a thread is provided by all operating systems that support threads, but was not provided by prior art shell programs. The closest that prior art shell programs have come to this, is providing the ability to wait on child processes, but without the ability to pass status information from the child process to its parent.

Parameters "p1, . . . , pn" represent a variable number of parameters that may be passed by the invoking thread to the invoked thread, or vice versa. These may be variables used as input by the new thread or to contain output from the new thread. Since the parallel threads share a common address space, these variables, which will be shared by two or more threads, will be treated as global variables. Thus, commands executed in an invoked thread may perform various computations, and the invoked thread can pass computational results and status information to its invoking thread by storing such information in these shared variables, making that information available for use by the invoking thread.

Shell programs often produce an audit trail of each command executed, just as if an operator were entering the commands from a terminal. As is standard, the audit trail may go directly to a terminal for immediate viewing, or it may be diverted to a disk file to be printed and/or examined later. If two or more shell threads are executing and producing console/terminal output, the output from the various threads will be mixed together, i.e., an audit trail line from one thread may be followed by an audit trail line from another thread. Therefore, in the preferred embodiment, the audit trail generator 190 of the shell program identifies each thread's output by a prefix:

```
user_t1 > command_A
user_t2 > command_X
user_t1 > command_B
user_t1 > command_C
user_t2 > command_Y
``` where "user_t1" and "user_t2" are examples of the prefixes used to identify first and second parallel threads. The thread's visual identification in the audit trail can be assigned by the shell, as in the above example, or could be specified as a parameter in the call invoking the new thread (i.e., one of the parameters of the "thread" command could be a text string to be used for identifying the thread's audit trail lines).

As mentioned above, terminal output of the new thread may be diverted to a disk file. An example of the command for both assigning a prefix to audit trail lines and for diverting the audit trail to a disk file is as follows:

```
thread("t2", entry_point, thread_id, p1, . . . ,
  pn) > t2_output.lis
``` where the new thread's visual identifier is "t2" and its terminal output, including the audit trail, is diverted to a file named "t2_output.lis".

The advantages of using parallel threads of execution, even in a single processor environment, are well-documented in computer literature. In particular, even in a single processor computer, parallel threads of execution will reduce computation time because of the ability to overlap CPU-intensive operations with other operations that are not CPU-intensive, such as disk access and other input/output tasks. Using the present invention, two or more threads mapped to the same address space can be executing synchronous commands, relative to a specific task, in parallel.

Consider an example in which a shell script has four major steps:

Step 1: Runs 3 programs serially, but can be done parallel to steps 2 and 3.

Step 2: Runs 3 programs serially, but can be done parallel to steps 1 and 3.

Step 3: Runs 1 program which can be executed in parallel with steps 1 and 2.

Step 4: Cannot be run until steps 1-3 are complete.

The C-Shell prior art shell program can perform the above script by creating three child processes, one for each of steps 1, 2 and 3. The parent process would then wait until all of its child processes have terminated before executing step 4. The C-Shell script for this would be:

```
#step 1
((step1.1 && step1.2) && step1.3) &
#step 2
((step2.1 && step2.2) && step2.3) &
#step 3
step3.1 &
#step 4
wait
step4.1
```

However, when using C-Shell the status of each step is not communicated to the parent process. Therefore step 4 will run even if any of steps 1, 2 or 3 have failed. A common method of overcoming this deficiency is to write an application program which actually does the forks (i.e., creates the child processes) for steps 1, 2 and 3, and manipulates the program's exit status to be failure if any one of the three steps failed. The new C-Shell script using this solution is:

```
Special_application_program && step4.1
```

Since most of the script is now contained in an application program, typically written in a programming language such as C, the actual script is obscured and, in fact, not discernible from the C-Shell script. This also makes it more difficult to maintain or modify the script, because that would require the services of a programmer familiar with the programming language used for the special application program. Further, the only reason for making this obscure and difficult to understand script was that the prior art shell program did not provide a mechanism for passing information between child and parent processes, which is necessary to "synchronize" the execution of multiple sets of commands.

With the present invention, the script for the above example is as follows:

```
thread(step1, step1_id)
thread(step2, step2_id)
thread(step3, step3_id)
wait_for_thread(step1_id,step_status)
if(step_status ≠ success) then
   take appropriate corrective action
endif
wait_for_thread(step2_id,step_status)
if (step_status ≠ success) then
   take appropriate corrective action
endif
wait_for_thread(step3_id,step_status)
if (step_status ≠ success) then
   take appropriate corrective action
endif
step4.1
step1:
   step1.1
   step1.2
   step1.3
step2:
   step2.1
   step2.2
   step2.3
step3:
   step3.1

\* end of script
```

In the above script, "step1" is initiated as a parallel thread, with its identifier returned in "step1_id". The other two steps are initiated similarly. The script then waits on completion of "step1", accepting its status in "step_status". If "step1" was not successful, the script can take corrective action, such as aborting execution of the remainder of the script. Otherwise processing continues with the "wait_for_thread" of the next step, and so on. Once all three steps have been verified to have successfully completed, "step4.1" is executed.

Thus, as shown, the present invention provides parallel processing of commands by a shell program in a much cleaner, more straightforward, easier to maintain environment than prior shell programs. The present invention's shell program provides inherent synchronization not provided by the use of child processes.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A multitasking computer system, comprising:

a multitasking central processor;

memory means coupled to said multitasking central processor, said memory means storing an operating system and a command processing shell program which processes commands submitted thereto;

said multitasking computer system including:

means for receiving a script of commands for processing by a parent thread of execution, said script defining sets of commands to be executed by said computer system;

thread generating means for generating new threads of execution, each sharing a common address space with said parent thread of execution;

command processing means for processing a subset of said commands in said script in said parent thread of execution and for processing other subsets of said commands in said script in each of said generated threads of execution; and synchronization means for synchronizing execution of said parent thread of execution with completion of at least one of said generated threads of execution, and for receiving completion status information from said at least one generated thread of execution, said completion status information indicating whether or not said generated thread of execution has been executed;

said command processing means including conditional command processing means for processing conditional commands, including commands for comparing said received completion status information with specified criteria, and for performing specified tasks if said comparison indicates that said at least one generated thread of execution has been completed.

2. The multitasking computer system set forth in claim 1,
wherein said script contains at least one thread-generation command for generating at least one subset of commands to be executed in a separate thread of execution, each new thread of execution being generated by said thread generating means in response to a said thread-generation command.

3. The multitasking computer system set forth in claim 1,
said thread generating means including means for specifying a set of global parameter variables, corresponding to each said generated thread of execution, wherein each said set of global parameter variables are accessible by both said parent thread of execution and the corresponding generated thread of execution;
said command processing means including means for storing information in said specified set of global parameter variables corresponding to a first said generated thread of execution while processing commands in said first generated thread of execution;
whereby said information stored in said specified sets of global parameter variables during processing of commands in said generated threads of execution is accessible by said parent thread of execution.

4. The multitasking computer system set forth in claim 3,
wherein said information stored in said specified sets of global parameter variables during processing of commands in said generated threads of execution includes said completion status information.

5. The multitasking computer system set forth in claim 3,
wherein at least one of said commands, processed by said command processing means in a first said generated thread of execution, performs a specified computation, generating at least one computed result which is then stored by said command processing means in specified ones of said global parameter variables corresponding to said first generated thread of execution;
whereby computational results generated in said first generated thread of execution is accessible by said parent thread of execution.

6. A method of processing commands submitted to a multitasking computer system, wherein the method is implemented by the multitasking computer system, executing the steps of:
initiating execution of a parent thread of execution, said parent thread of execution for interpreting a script of commands, said script defining sets of commands to be executed by said computer system;
generating additional, new threads of execution, each sharing a common address space with said parent thread of execution;
processing a subset of said commands in said script in each of said generated threads of execution; and
synchronizing execution of said parent thread of execution with completion of at least one said generated thread of execution, and for receiving completion status information from said at least one generated thread of execution, said completion status information indicating whether or not said generated thread of execution has been executed;
processing conditional commands, including commands for comparing said received completion status information with specified criteria, and for performing specified tasks if said comparison indicates that said at least one generated thread of execution has been completed.

7. The method of claim 6,
wherein said script contains at least one thread-generation command for generating at least one subset of commands to be executed in a separate thread of execution, each new thread of execution being generated by said generating step in response to a said thread-generation command.

8. The method of claim 6,
said thread generating step including specifying a set of global parameter variables, corresponding to each said generated thread of execution, wherein each said set of global parameter variables are accessible by both said parent thread of execution and the corresponding generated thread of execution;
said command processing step including storing information in said specified set of global parameter variables corresponding to a first said generated thread of execution while processing commands in said first generated thread of execution;
whereby said information stored in said specified sets of global parameter variables during processing of commands in said generated threads of execution is accessible by said parent thread of execution.

9. The method of claim 8,
wherein said information stored in said specified sets of global parameter variables during processing of commands in said generated threads of execution includes said completion status information.

10. The method of claim 8,
wherein at least one of said commands, processed by said command processing step in a first said generated thread of execution, performs a specified computation and generating at least one computed result; and
storing said computed result in specified ones of said global parameter variables corresponding to said first generated thread of execution;
whereby computational results generated in said first generated thread of execution is accessible by said parent thread of execution.

* * * * *